United States Patent
Park et al.

(10) Patent No.: US 9,036,976 B2
(45) Date of Patent: May 19, 2015

(54) METHOD AND APPARATUS FOR REPRODUCING CONTENT

(71) Applicant: SAMSUNG ELECTRONICS CO., LTD., Suwon-si (KR)

(72) Inventors: Young-min Park, Seongnam-si (KR); Keum-yong Oh, Yongin-si (KR); Jun-eok Ahn, Suwon-si (KR); Da-na Jung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/294,830

(22) Filed: Jun. 3, 2014

(65) Prior Publication Data

US 2014/0289763 A1 Sep. 25, 2014

Related U.S. Application Data

(63) Continuation of application No. 12/635,890, filed on Dec. 11, 2009, now Pat. No. 8,787,727.

(30) Foreign Application Priority Data

Jan. 9, 2009 (KR) ........................ 10-2009-0001944

(51) Int. Cl.
| | |
|---|---|
| *H04N 5/77* | (2006.01) |
| *H04N 21/45* | (2011.01) |
| *H04N 5/445* | (2011.01) |
| *H04N 5/85* | (2006.01) |

(Continued)

(52) U.S. Cl.
CPC ....... *H04N 21/4516* (2013.01); *H04N 5/44591* (2013.01); *H04N 5/85* (2013.01); *H04N 7/17318* (2013.01); *H04N 9/8715* (2013.01); *H04N 21/42646* (2013.01); *H04N 21/4325* (2013.01); *H04N 21/4882* (2013.01); *H04N 21/6543* (2013.01); *H04N 21/814* (2013.01); *H04N 21/8146* (2013.01)

(58) Field of Classification Search
None
See application file for complete search history.

(56) References Cited

U.S. PATENT DOCUMENTS

| | | |
|---|---|---|
| 2003/0093788 A1 | 5/2003 | Takenaka |
| 2006/0015916 A1 | 1/2006 | Yun |

(Continued)

FOREIGN PATENT DOCUMENTS

| | | |
|---|---|---|
| JP | 5-219504 A | 8/1993 |
| JP | 2002-262192 A | 9/2002 |

(Continued)

OTHER PUBLICATIONS

Communication, dated Mar. 11, 2014, issued by the Japanese Patent Office in counterpart Japanese Application No. 2010-003045.

(Continued)

*Primary Examiner* — William C Vaughn, Jr.
*Assistant Examiner* — Eileen Adams
(74) *Attorney, Agent, or Firm* — Sughrue Mion, PLLC

(57) ABSTRACT

A method of displaying a message received from a server during reproducing content includes: receiving the message provided to a user terminal, from the server, during the reproducing the content stored in a storage medium; determining an operation mode of the user terminal related to a priority order of the message; and providing the message according to the determined operation mode of the user terminal.

11 Claims, 4 Drawing Sheets

(51) Int. Cl.
*H04N 7/173* (2011.01)
*H04N 9/87* (2006.01)
*H04N 21/426* (2011.01)
*H04N 21/432* (2011.01)
*H04N 21/488* (2011.01)
*H04N 21/6543* (2011.01)
*H04N 21/81* (2011.01)

(56) References Cited

U.S. PATENT DOCUMENTS

| | | |
|---|---|---|
| 2006/0064700 A1 | 3/2006 | Ludvig et al. |
| 2006/0074550 A1* | 4/2006 | Freer et al. ............. 701/209 |
| 2007/0118861 A1 | 5/2007 | Stone |
| 2007/0199016 A1 | 8/2007 | Yun et al. |
| 2008/0025707 A1* | 1/2008 | Sawada et al. ............. 386/126 |
| 2008/0133748 A1* | 6/2008 | Nicholas ............. 709/224 |
| 2008/0222546 A1* | 9/2008 | Mudd et al. ............. 715/765 |
| 2009/0210912 A1 | 8/2009 | Cholas et al. |
| 2009/0279850 A1 | 11/2009 | Hirata |
| 2010/0070995 A1* | 3/2010 | Pan ............. 725/34 |

FOREIGN PATENT DOCUMENTS

| | | |
|---|---|---|
| JP | 2002-374219 A | 12/2002 |
| JP | 2003-209761 A | 7/2003 |
| JP | 2003-244600 A | 8/2003 |
| JP | 2004-289279 A | 10/2004 |
| JP | 2005-236913 A | 9/2005 |
| JP | 2006-325090 A | 11/2006 |
| JP | 2006-333490 A | 12/2006 |
| JP | 2007-282082 A | 10/2007 |
| JP | 2008-311757 A | 12/2008 |
| KR | 10-2006-0034341 A | 4/2006 |
| KR | 10-2008-0058721 A | 6/2008 |
| WO | 2007-069379 A1 | 6/2007 |

OTHER PUBLICATIONS

Communication dated Jul. 9, 2013, issued by the Japanese Patent Office in counterpart Japanese Application No. 2010-003045.
Communication dated Aug. 26, 2014 issued by the Japanese Patent Office in counterpart Japanese Patent Application No. 2010-003045.
Communication dated Jan. 20, 2015, issued by the Korean Intellectual Property Office in counterpart Korean Application No. 10-2009-0001944.

* cited by examiner

METHOD AND APPARATUS FOR REPRODUCING CONTENT

CROSS-REFERENCE TO RELATED PATENT APPLICATIONS

This is a continuation of application Ser. No. 12/635,890, filed on Dec. 11, 2009, which claims priority from Korean Patent Application No. 10-2009-0001944, filed on Jan. 9, 2009, in the Korean Intellectual Property Office, the disclosures of which are incorporated herein in their entireties by reference.

BACKGROUND OF THE INVENTION

1. Field of the Invention

Methods and apparatuses consistent with the present invention relate to reproducing content, and more particularly, to a method and apparatus for reproducing content stored in an information storage medium.

2. Description of the Related Art

As Blu-ray discs are widely used as information storage media for the next generation after digital versatile discs (DVDs), devices for playing the Blu-ray discs have been developed.

In addition, since a two-way digital cable service called Tru2way has become the standard of cable broadcasting, multi-function devices for providing functions of a Blu-ray disc player and a digital cable set-top box are being rapidly developed.

SUMMARY OF THE INVENTION

Exemplary embodiments of present invention provide a method and apparatus for reproducing content stored in an information storage medium, and a computer-readable recording medium having embodied thereon a computer program for executing the method.

According to an aspect of the present invention, there is provided an apparatus for reproducing content stored in an information storage medium and receiving a service provided from a remote server, the apparatus including: a service processing unit receiving a message provided to a user in relation to the service from the server while reproducing the content stored in the information storage medium; an operating mode determination unit determining whether to continuously reproduce the content stored in the information storage medium and whether to display the message according to a priority order of the message; and a content reproducing unit performing at least one of reproducing the content stored in the information storage medium and displaying the message according to the determination.

The information storage medium may be a blue-ray disc and the service may be a digital cable service.

The content reproducing unit may stop reproducing of the content stored in the information storage medium and may display the message fully on a screen.

The content reproducing unit may display the message and a digital cable channel relating to the message fully on the screen.

The content reproducing unit may display the message on a part of a screen.

The content reproducing unit may display the message and a digital cable channel relating to the message as Picture-in-Picture (PiP) on a part of the screen.

The content reproducing unit may display icons relating to the message on a part of the screen.

The content reproducing unit may display information relating to the priority order of the message on a part of the screen.

The content reproducing unit may display the message after completely reproducing the content stored in the information storage medium.

The message may be an emergency message, a message informing of the upgrading of software relating to the digital cable service, or a message informing of the upgrading of firmware of a cable card.

According to another aspect of the present invention, there is provided a method of reproducing content executed in an apparatus for reproducing content stored in an information storage medium and receiving a service provided from a remote server, the method including: receiving a message provided to a user in relation to the service from the server while reproducing the content stored in the information storage medium; determining whether to continuously reproduce the content stored in the information storage medium and whether to display the message according to a priority order of the message; and performing at least one of reproducing the content stored in the information storage medium and displaying the message according to the determination.

According to another aspect of the present invention, there is provided an information storage medium having embodied thereon a program for executing the method of reproducing content.

BRIEF DESCRIPTION OF THE DRAWINGS

The above and other features and aspects of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which exemplary embodiments of the invention are shown.

Figure 1:
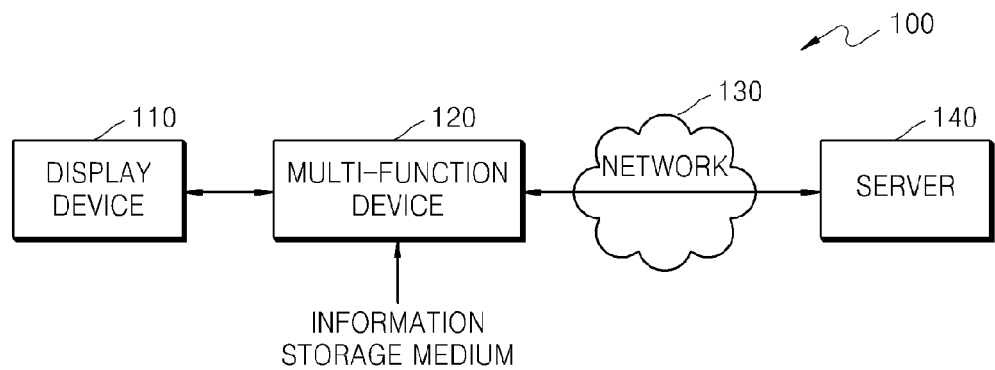
FIG. 1 is a block diagram of a content reproducing system including a multi-function device, according to an exemplary embodiment of the present invention.

FIG. 1 is a block diagram of a content reproducing system 100 including a multi-function device 120, according to an exemplary embodiment of the present invention.

The multi-function device 120 simultaneously provides functions of reproducing content stored in an information storage medium and receiving a predetermined service from a server 140. For example, the multi-function device 120 may simultaneously provide functions of a Blue-ray disc player and a digital cable set-top box. A digital cable service may be a two-way digital cable service, such as "Tru2Way", provided through a cable-broadcasting network 130. In this case, the server 140 provides digital cable content.

Hereinafter, a Blue-ray disc is described as an information storage medium and a digital cable service is described as a service provided from the server 140. However, the present exemplary invention is not limited thereto and it would have been obvious to one of ordinary skill in the art that all multi-function devices receiving content from other information storage media and receiving other services may apply.

The multi-function device 120 reproduces content stored in a Blue-ray disc or receives a digital cable service from the server 140 so as to display the received service on a display device 110. Since the multi-function device 120 decodes and reproduces content stored in a Blue-ray disc according to the to Blue-ray standards, and receives a digital cable service according to the standards of digital cable service, reproduction of content stored in a Blue-ray disc and reception of the digital cable service do not affect each other.

The digital cable service according to "Tru2Way" defines a message forcefully displayed on a screen and a channel related to the message. For example, the digital cable service forcefully displays a predetermined emergency message, when an emergency such as an accident or a natural disaster occurs, and a channel related to the emergency message on a screen according to an Emergency Alert System (EAS).

Accordingly, the priority order of the message is classified as 'Test', 'Low', 'Medium', 'High', and 'Maximum'. In 'Maximum,' the message and the channel related to the message are forcefully displayed on a screen. In 'High,' only the message is forcefully displayed on a screen.

Since the multi-function device 120 simultaneously reproduces content stored in a Blue-ray disc and receives the digital cable service, the processing of the emergency message is not defined therein. For example, when the multi-function device 120 receives an emergency message through the digital cable service while operating as a Blue-ray player, whether to pause or stop reproducing the content for displaying the emergency message or whether to continuously reproduce the content is not defined because the functions of Blue-ray player and the functions of a digital cable set-top box are separately operated according to their respective standards.

With regard to the upgrading of the digital cable set-top box, the same problem occurs. For example, when the multi-function device 120 needs to upgrade software relating to the digital cable service and the user does not know the progress of the upgrading, malfunctions of the multi-function device 120 may occur. In addition, when the multi-function device 120 receives predetermined data from the server 140 and upgrades the firmware of a cable card needed to use the digital cable service, if the upgrading status is not known by a user, malfunctions may occur due to an accident such as forced separation of the cable card during the upgrading of firmware.

Accordingly, a method and apparatus for appropriately displaying the message received from the server 140 on the display device 110, while the multi-function device 120 reproduces content stored in a Blue-ray disc, are required and are described in more detail with reference to FIGS. 2 through 5.

Figure 2:
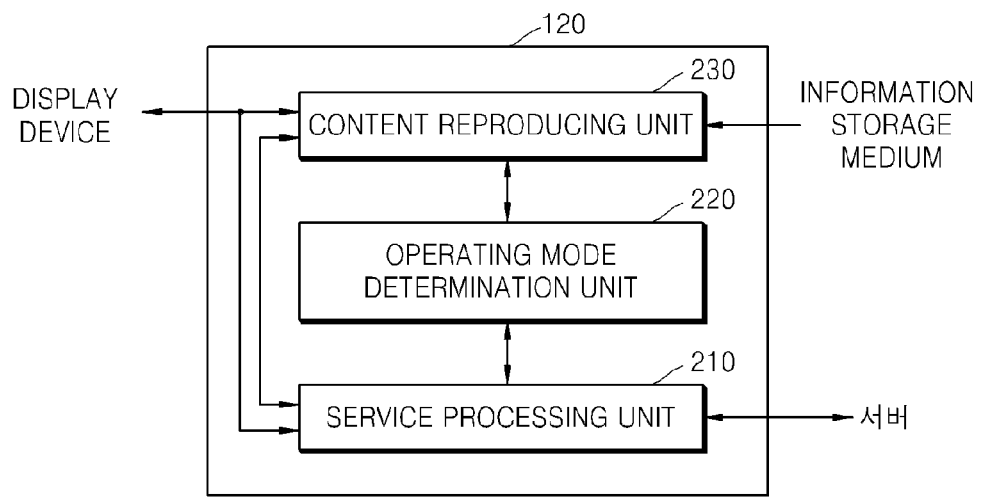
FIG. 2 is a block diagram of the multi-function device illustrated in FIG. 1.

FIG. 2 is a block diagram of the multi-function device 120.

Referring to FIG. 2, the multi-function device 120 includes a service processing unit 210, an operating mode determination unit 220, and a content reproducing unit 230.

The service processing unit 210 receives a digital cable service provided from the server 140 at a remote place and provides the digital cable service received from the server 140 through the cable-broadcasting network 130 to a user through the display device 110. In addition, the service processing unit 210 receives a message relating to the digital cable service from the server 140 while the multi-function device 120 reproduces content stored in an information storage medium. Such a message needs to be provided to a user in relation to use of the digital cable service and the priority order of the message is determined according to the degree of urgency of the message.

The message provided to a user relates to use of the digital cable service and may be an emergency message according to EAS, or a message informing of the upgrading of software relating to the digital cable service or the upgrading of firmware of a cable card by the multi-function device 120.

In addition, the message provided to a user may be a message informing a user whether to record the digital cable broadcasting during reproducing by the Blue-ray disc. When a user reserves recording of the digital cable broadcasting, the user is informed of the start and end of recording so that the user identifies the operating state of the multi-function device 120. The messages provided to a user are described as above. However, the present exemplary invention is not limited thereto and it would have been obvious to one of ordinary skill in the art that all messages provided to a user in relation to use of the digital cable service may apply.

The operating mode determination unit 220 determines an operating mode of the multi-function device 120 from among a Blue-ray player mode and a digital cable set-top box mode.

For example, when a Blue-ray disc is inserted into the multi-function device 120 while the multi-function device 120 receives the digital cable service and operates in the digital cable set-top box mode, the operating mode determination unit 220 changes an operating mode of the multi-function device 120 to the Blue-ray player mode.

According to the present exemplary embodiment, the operating mode determination unit 220 may determine an operating mode of the multi-function device 120 based on the message received from the server 140 while the multi-function device 120 reproduces content stored in a Blue-ray disc. Whether to change an operating mode of the multi-function device 120, which is already operating in the Blue-ray player mode, to the digital cable set-top box mode is determined based on the priority order of the message received from the server 140. Determination of an operating mode includes determination on whether to continuously reproduce content stored in a Blue-ray disc and determination on whether to display the message on a screen.

When the message provided to a user has a high priority order, the operating mode determination unit 220 pauses or stops reproducing a Blue-ray disc and determines an operating mode of the multi-function device 120 so as to display the message fully on a screen. In this case, the operating mode of the multi-function device 120 is changed from the Blue-ray player mode to the digital cable set-top box mode according to the determination of the operating mode determination unit 220.

In addition, the operating mode determination unit 220 may determine an operating mode to continuously maintain the Blue-ray player mode in consideration of the priority order of the message provided to a user and to display the message on a part of a screen.

When the message provided to a user has a low priority order, the operating mode determination unit 220 may determine an operating mode of the multi-function device 120 to continuously maintain the Blue-ray player mode and to display the message after completely reproducing content stored in a Blue-ray disc.

The content reproducing unit 230 performs at least one of reproducing content stored in a Blue-ray disc and displaying the message provided to a user according to the determination of the operating mode determination unit 220, as will be described more fully with reference to FIGS. 3A through 3D.

FIGS. 3A through 3D illustrate a method of displaying a message, according to an exemplary embodiment of the present invention.

Figure 3A:
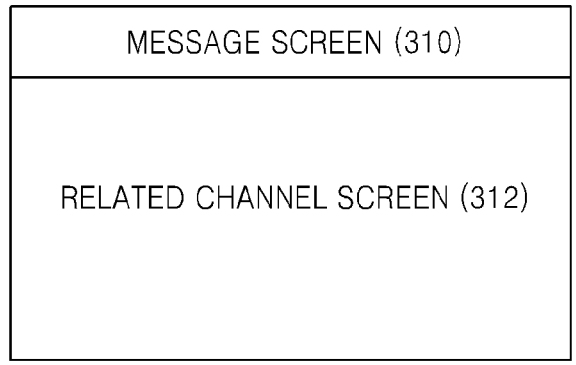
FIGS. 3A, 3B, 3C, and 3D illustrate a method of displaying a message, according to an exemplary embodiment of the present invention.

When the operating mode determination unit 220 determines an operating mode of the multi-function device 120 to display a message fully on a screen, the content reproducing unit 230 pauses or stops reproducing content and the message is displayed fully on the screen as illustrated in FIG. 3A. The message is only displayed fully on the screen or the message and a digital cable channel relating to the message are displayed fully on the screen.

For example, when an emergency such as an accident or a natural disaster occurs according to EAS, the reproducing of a Blue-ray disc is paused or stopped and an emergency message 310 and a digital cable channel 312 relating to the emergency message 310 are displayed fully on the screen.

Figure 3B:
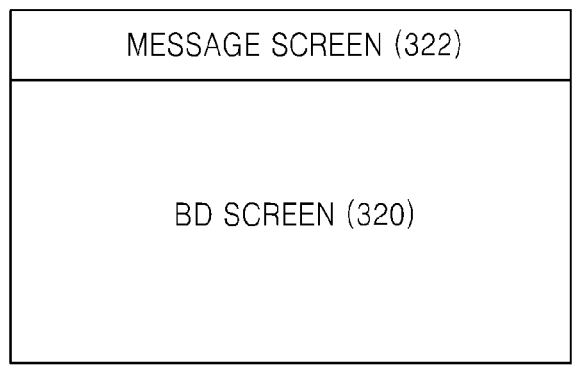
Figure 3C:
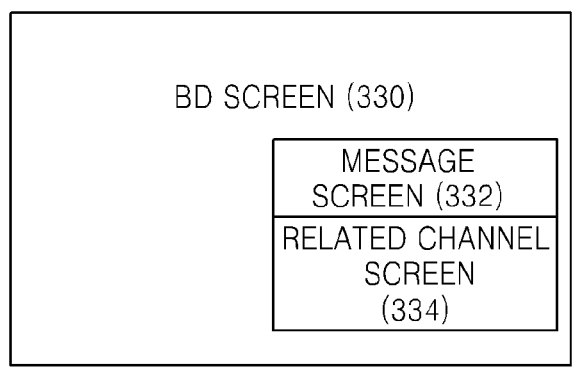

When the operating mode determination unit 220 determines an operating mode of the multi-function device 120 to continuously maintain the Blue-ray player mode and to display the message on a part of a screen, the content reproducing unit 230 simultaneously reproduces the content stored in a Blue-ray disc and displays the message received from the server 140. In this case, the message is displayed on a screen part 322. For example, as illustrated in FIG. 3B, the message is displayed on the screen part 322 and the content reproduced by the Blue-ray disc is displayed on a remaining screen part 320. In addition, the content reproducing unit 230 may display the message as Picture-in-Picture (PiP). As illustrated in FIG. 3C, the message and the channel relating to the message are displayed on screen parts 332 and 334 and the content reproduced by the Blue-ray disc is displayed on a remaining screen part 330.

Figure 3D:
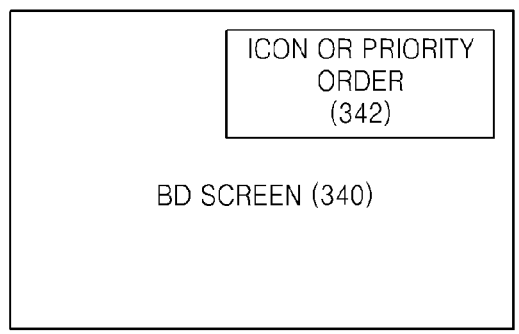

According to another exemplary embodiment of the present invention, the content reproducing unit 230 may not directly display the received message and instead briefly display whether to receive the message from the server 140 to a user. In other words, as illustrated in FIG. 3D, icons informing whether to receive the message or the priority order of the received message may be briefly displayed to a user on a part of a screen. The icons may be designed to be different to each other according to the details of the messages in order for a user to recognize the details of the messages.

When the operating mode determination unit 220 determines an operating mode of the multi-function device 120 to display the message after completely reproducing the content stored in a Blue-ray disc, the content reproducing unit 230 continuously reproduces the content stored in a Blue-ray disc fully on a screen and the message is displayed fully on the screen after completely reproducing the content stored in a Blue-ray disc.

Figure 4:
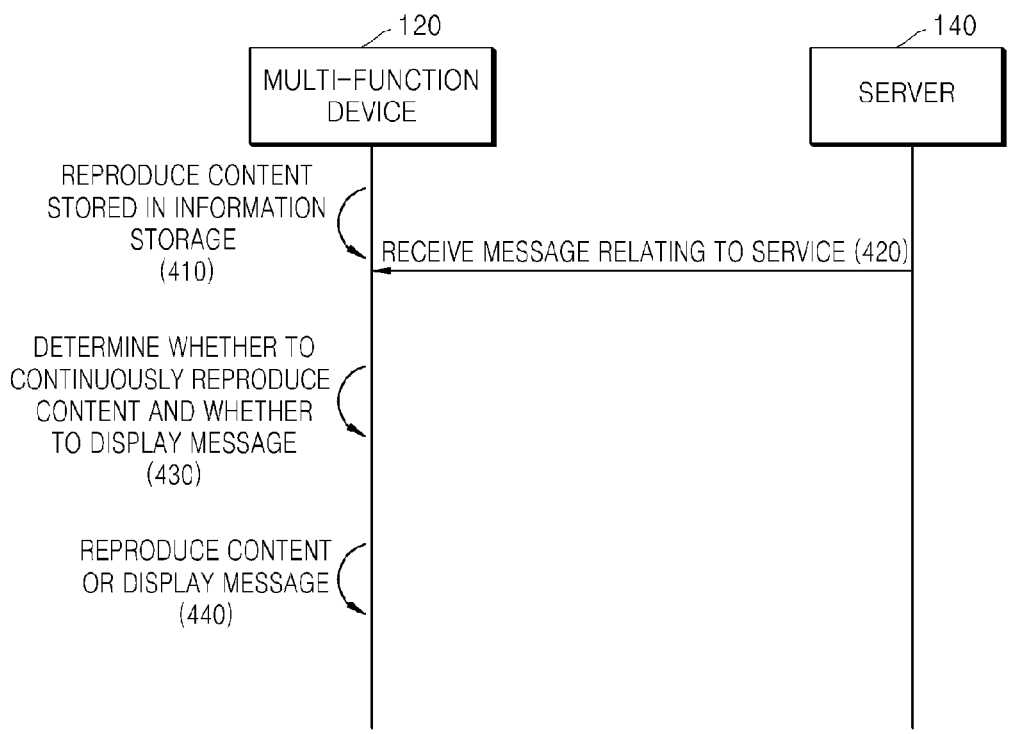
FIG. 4 is a diagram illustrating a method of reproducing content, according to an exemplary embodiment of the present invention.

FIG. 4 is a diagram illustrating a method of reproducing content, according to an exemplary embodiment of the present invention.

Referring to FIG. 4, the multi-function device 120 reproduces the content stored in an information storage medium, in operation 410. According to the present exemplary embodiment, the multi-function device 120, which provides functions of a Blue-ray disc player and a digital cable set-top box, reproduces the content stored in a Blue-ray disc.

In operation 420, the multi-function device 120 receives a message relating to a service from the server 140 at a remote place while reproducing the Blue-ray disc. As described above, the server 140 may provide a digital cable service and the message may be provided to a user in relation to the digital cable service.

The message provided to a user may be an emergency message according to EAS, or a message informing of the upgrading of software relating to the digital cable service or the upgrading of firmware of a cable card by the multi-function device 120. Such messages relate to information forcefully provided to users who uses the digital cable service.

In operation 430, the multi-function device 120 determines whether to continuously reproduce the content stored in an information storage medium and whether to display the message based on the priority order of the message received in operation 420.

If the message provided to a user has a high priority order, the multi-function device 120 pauses or stops reproducing the Blue-ray disc and determines to display the message fully on a screen.

In addition, the multi-function device 120 may determine to continuously maintain the Blue-ray player mode in consideration of the priority order of the message provided to a user, to allocate a part of a screen to display the message, or to display the message after completely reproducing the content stored in the Blue-ray disc.

In operation 440, the multi-function device 120 performs at least one of reproducing the content stored in an information storage medium and displaying the message provided to a user according to the determination in operation 430.

The message and/or the digital cable channel relating to the message may be displayed fully on a screen, or the content may be continuously reproduced and the message may not be displayed. In addition, the message may be displayed on a part of a screen. In this case, icons relating to the message or information on the priority order may be briefly displayed.

Figure 5:
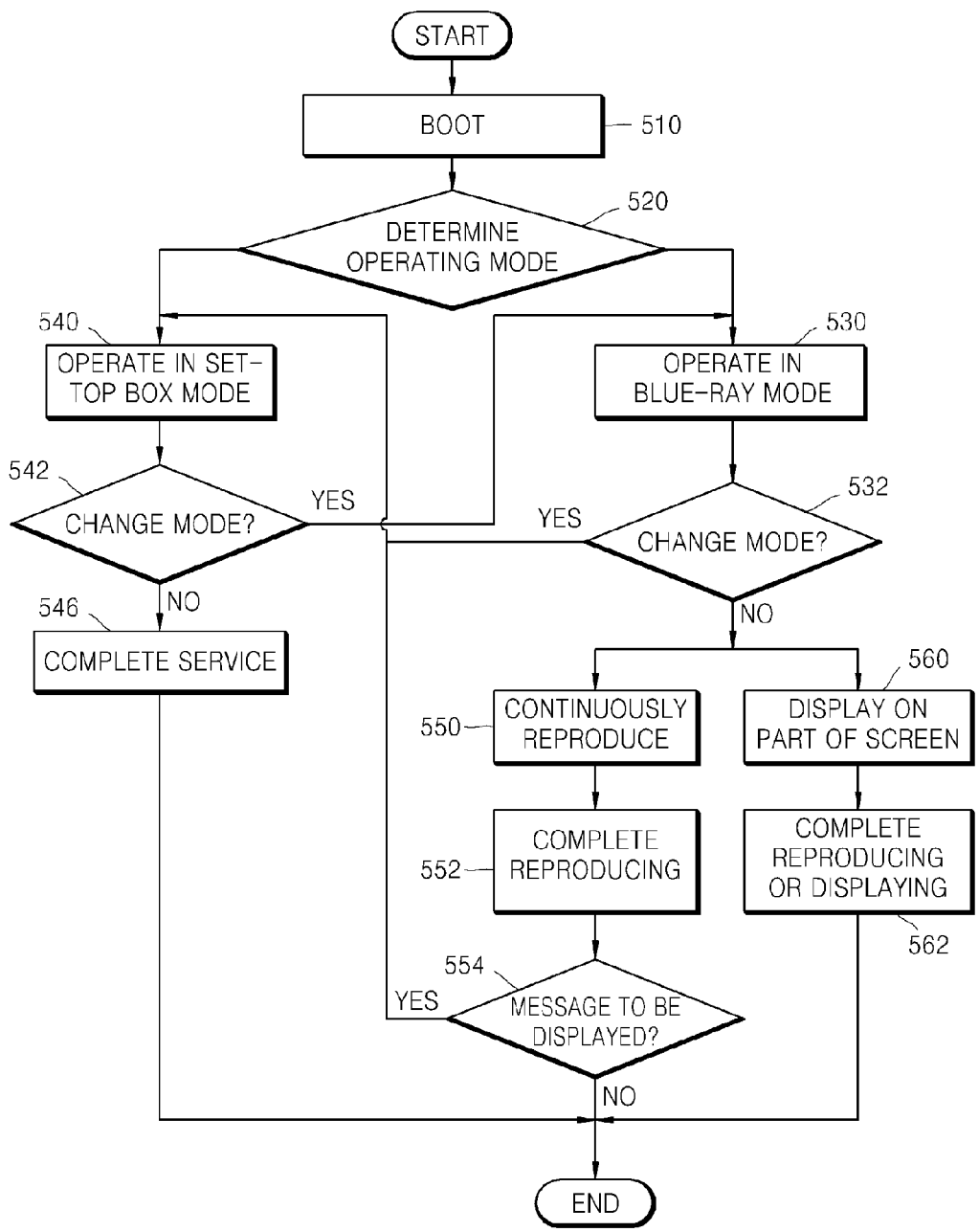
FIG. 5 is a flowchart illustrating a method of operating the multi-function device illustrated in FIG. 1, according to an exemplary embodiment of the present invention.

FIG. 5 is a flowchart illustrating a method of operating the multi-function device 120, according to an exemplary embodiment of the present invention.

Referring to FIG. 5, the multi-function device 120 is booted and determines an operating mode of the multi-function device 120, in operations 510 and 520. According to the present exemplary embodiment, since the multi-function device 120 provides the functions of a Blue-ray disc player and a digital cable set-top box, the multi-function device 120 determines an operating mode of the multi-function device 120 from among two operating modes, in operation 520. After the multi-function device 120 is booted, various methods may be used to determine the operating mode of the multi-function device 120.

For example, when a Blue-ray disc is inserted into the multi-function device 120, an operating mode of the multi-function device 120 may be determined as that the multi-function device 120 is operating as a Blue-ray disc player. Also, an operating mode of the multi-function device 120 may be determined as that the multi-function device 120 is operating in a default mode set by a user.

A case where the operating mode is a Blue-ray disc player will be described.

In operation 530, the multi-function device 120 operates as a Blue-ray disc player according to the determination in operation 520.

In operation 532, the multi-function device 120 determines whether to change an operating mode of the multi-function device 120. The message may be provided to a user in relation to the digital cable service.

If a user input directing change of a mode exists or the priority order of the message is high, and thus, the message needs to be displayed on a screen prior to reproducing of a Blue-ray disc, operation 540 is performed to change an operating mode of the multi-function device 120 to the digital cable set-top box mode and the message and/or the digital cable channel relating to the message are displayed fully on a screen.

If the priority order of the message is low so as to delay displaying of the message, an operating mode of the multi-function device 120 is not changed and the content stored in a Blue-ray disc is continuously reproduced, in operation 550. If reproducing of the content is completed in operation 552, whether there is a message to be displayed on a screen is determined in operation 554. If there is a message to be displayed on a screen, operation 540 is performed and the message and/or the digital cable channel relating to the message are displayed on a screen.

If the message does not need to be displayed fully on a screen, an operating mode is not changed in operations 560 and 562 and the message and/or the digital cable channel relating to the message are displayed on a part of a screen while reproducing the content stored in a Blue-ray disc. The displaying of the message and/or the digital cable channel relating to the message on a part of a screen is described above with reference to FIGS. 3B through 3D.

If the operating mode of the multi-function device 120 is a digital cable set-top box mode, the multi-function device 120 is operated in the digital cable set-top box mode, in operation 540. The multi-function device 120 determines whether to change an operating mode while being operated. External input such as a user input directing change of an operating mode or insertion of a Blue-ray disc may be a condition for changing an operating mode. If an operating mode of the multi-function device 120 is changed to the Blue-ray disc player mode, operation 530 and its following operations are performed.

Otherwise, if an operating mode of the multi-function device 120 is not changed, the multi-function device 120 is operated in the digital cable set-top box mode until the service is completed in operation 546. Thus, the multi-function device 120 receives the digital cable service and provides the received digital cable service to a user through the display device 110.

According to exemplary embodiments of the present invention, a multi-function device including a function of reproducing content stored in an information storage medium and a function of receiving a service from a remote server may reproduce the content and display an emergency message relating to the service based on the urgency of the message. Accordingly, the intention of a service provider, who forcefully provides the message to a user, is accomplished and the content is reproduced so that use of the multi-function device is maximized.

Exemplary embodiments of the present invention can also be embodied as computer-readable code on a computer-readable recording medium.

For example, an apparatus for reproducing content according to an exemplary embodiment of the present invention may include a bus coupled to units included in the apparatus illustrated in FIG. 2 and at least one processor combined with the bus. In addition, a memory coupled to the at least one processor may be included, the at least one processor being combined with the bus for storing commands, receive messages, or generate messages and for performing the commands.

The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion.

While exemplary embodiments of the present invention have been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of displaying a message received from a server during reproducing content, the method comprising:
receiving the message provided to a user terminal from the server during the reproducing the content stored in a storage medium;
determining an operation mode of the user terminal related to a priority order of the message; and
providing the message according to the determined operation mode of the user terminal,
wherein the operation mode is at least one of continuously reproducing the content stored in the storage medium and displaying the message; stopping the reproducing of the content stored in the storage medium and displaying the message in full-screen view; continuously reproducing the content stored in the storage medium and displaying the message after completely reproducing the content; displaying the message and icons relating to the message on a part of a screen; and continuously reproducing the content stored in the storage medium and displaying the message on a part of a screen.

2. The method of claim 1, wherein content of the message is related to a service provided from the server.

3. The method of claim 1, wherein the displaying of the message on the part of the screen comprises displaying the message and a channel relating to the message in a Picture-in-Picture (PiP).

4. The method of claim 1, wherein the displaying of the message on the part of the screen comprises displaying information relating to the priority order of the message.

5. The method of claim 1, wherein the message is an emergency message, a message informing of an upgrading of software relating to a service, or a message informing of an upgrading of firmware.

6. A non-transitory storage medium having embodied thereon a program which, when executed by a computer, causes the computer to perform the method of claim 1.

7. An apparatus for displaying a message from a server during reproducing content stored in a storage medium, the apparatus comprising:
a service processor which receives a message from a server, during reproducing the content stored in the storage medium;
an operating mode determiner which determines operation mode related to a priority order of message; and
a content reproducer which displays the message, according to a determination of the operation mode,
wherein the content reproducer performs at least one of continuously reproducing the content stored in the storage medium and displaying the message; stopping the reproducing of the content stored in the storage medium and displaying the message in full-screen view; continuously reproducing the content stored in the storage medium and displaying the message after completely reproducing the content; and continuously reproducing the content stored in the storage medium; displaying the message and icons relating to the message on a part of a screen; and displaying the message on a part of a screen based on the determined operation mode.

8. The apparatus of claim 7, wherein the content of the message is related to a service provided from the server.

9. The apparatus of claim 7, wherein the content reproducer displays the message and a channel relating to the message in a Picture-in-Picture (PiP) on a part of the screen.

10. The apparatus of claim 7, wherein the displaying of the message on a part of a screen comprises displaying information relating to the priority order of the message on the part of the screen.

11. The apparatus of claim 7, wherein the message is an emergency message, a message informing of an upgrading of software relating to the service, or a message informing of an upgrading of firmware.

* * * * *